United States Patent [19]

Romano

[11] 3,965,405

[45] June 22, 1976

[54] DRIVING AND CONTROL SYSTEM FOR D.C. MOTORS

[75] Inventor: Carlo Romano, Montalto Dora (Turin), Italy

[73] Assignee: Ing. C. Olivetti & C., S.p.A., Ivrea (Turin), Italy

[22] Filed: Jan. 9, 1974

[21] Appl. No.: 431,908

[30] Foreign Application Priority Data
Jan. 16, 1973 Italy .............................. 67054/73
Oct. 16, 1973 Italy .............................. 70040/73

[52] U.S. Cl. ............................... 318/331; 318/317; 318/391; 318/432
[51] Int. Cl.² ............................................ H02D 5/06
[58] Field of Search .......... 318/331, 345, 305, 432, 318/391, 400, 410, 415, 416, 163, 342, 317

[56] References Cited
UNITED STATES PATENTS

| | | | |
|---|---|---|---|
| 3,568,027 | 3/1971 | Bacon | 318/331 |
| 3,593,075 | 7/1971 | Pantelakis | 318/391 |
| 3,617,715 | 11/1971 | Dummermuth | 318/571 |
| 3,708,737 | 1/1973 | Johnson | 318/331 |
| 3,732,472 | 5/1973 | Favre | 318/432 |
| 3,808,482 | 4/1974 | Wagensonner et al. | 318/331 |
| 3,878,446 | 4/1975 | Brandt | 318/331 |

*Primary Examiner*—Gene Z. Rubinson
*Assistant Examiner*—John J. Feldhaus
*Attorney, Agent, or Firm*—Schuyler, Birch, Swindler, McKie & Beckett

[57] ABSTRACT

A direct current motor driving and control system comprising a permanent-magnet direct-current motor with a rotor winding not having an iron core, a source of a reference voltage which rises in magnitude with a certain slope to a normal running level in response to a start command and falls again with a certain slope in response to a stop command, a drive circuit responsive to the reference voltage for feeding energizing current to the rotor winding, a resistor in series with the motor arranged to develop a feedback voltage proportional to the speed of the motor and a combining circuit arranged to apply the feedback voltage to act in combination with the reference voltage to establish a positive feedback action serving to compensate variations of the speed of the motor.

5 Claims, 3 Drawing Figures

DRIVING AND CONTROL SYSTEM FOR D.C. MOTORS

BACKGROUND OF THE INVENTION

The present invention relates to a system for driving and controlling the speed of permanent-magnet direct-current motors with a rotor winding comprising a coil without an iron core and of low inertia. These motors are used for the drive of the magnetic tape in equipment for recording and/or playing back magnetic tape cartridges and cassettes.

A motor of this type is fully described in the booklet entitled "Kleine Gleichstrommotoren mit eisenfreien Anker" (Small direct-current motors with iron-free armatures) by Dr. Otto Stemme, published by Interelectric A.G., Sachseln, Switzerland. Another motor suitable for the purposes of the present invention is that described in U.S. Pat. No. 3,467,847.

These motors are characterized by a very low inertia of the rotor because it is formed solely by the winding, completely lacking a rotating iron core; moreover, owing to their construction, they have a rotor inductance which is very low and, therefore, negligible with respect to the other electric quantities in action, so that it can be considered with good approximation that the speed of rotation of the motor is a linear function of the current supplied to it. Therefore, by varying the current supplied to the motor in any known manner whatsoever, the result will be obtained that the speed of rotation of the motor itself will follow the course taken by the current.

The use of magnetic tape cassettes of the type running at 12.5 inches per second (31.75 cm per second) is spreading more and more in the field of data transmission and in particular in electronic machines such as data collecting systems, small calculators, cash registers, etc. Because of the high operating speed of the electronic machines, optimization of the use of the magnetic tape is necessary. This is achieved by controlling and minimizing the running times of the tape also during the stages of starting up and braking the motor driving the tape. Moreover, a very uniform normal-working driving speed is required, with variations contained within predetermined limits.

It is known to use a reference voltage generating circuit connected to control a current supply circuit and adapted to generate a rising voltage slope for the starting function of the motor, a falling voltage slope for the braking function of the motor, and a constant voltage during the period between the two slopes for the normal-speed operation of the motor.

Apparatus used for driving the magnetic tape of cassettes is known in which the regulation of the speed is effected solely during the normal operation of the motor. In other arrangements known for reducing the braking time of the motor there are employed mechanical friction brakes of bulky and costly construction and the operation of which is limited by the wear of the rubbing elements. The objects mentioned above are achieved by the system described in the present specification, which enables not more than 2,9 cm of tape to run past the playback and/or recording head during the starting and braking stages, and is capable of maintaining variations of speed within 5% of the nominal value under the worst operating conditions.

SUMMARY OF THE INVENTION

According to the present invention, there is provided a direct-current motor driving and control system comprising a permanent-magnet direct current motor with rotor winding not having an iron core, a source of a reference voltage which rises in magnitude with a certain slope to a normal running level in response to a start command and falls again with a certain slope in response to a stop command, a driver circuit responsive to the reference voltage to feed energizing current to the rotor winding, a resistor in series with the motor arranged to develop a feedback voltage proportional to the speed of the motor and a combining circuit arranged to apply the feedback voltage to act in accordance to the reference voltage to establish a positive feedback action serving to regulate the speed of the motor.

BRIEF DESCRIPTION OF THE DRAWINGS

The invention will be described in more detail, by way of example, with reference to the accompanying drawings, in which.

DESCRIPTION OF A PREFERRED EMBODIMENT

Figure 1:
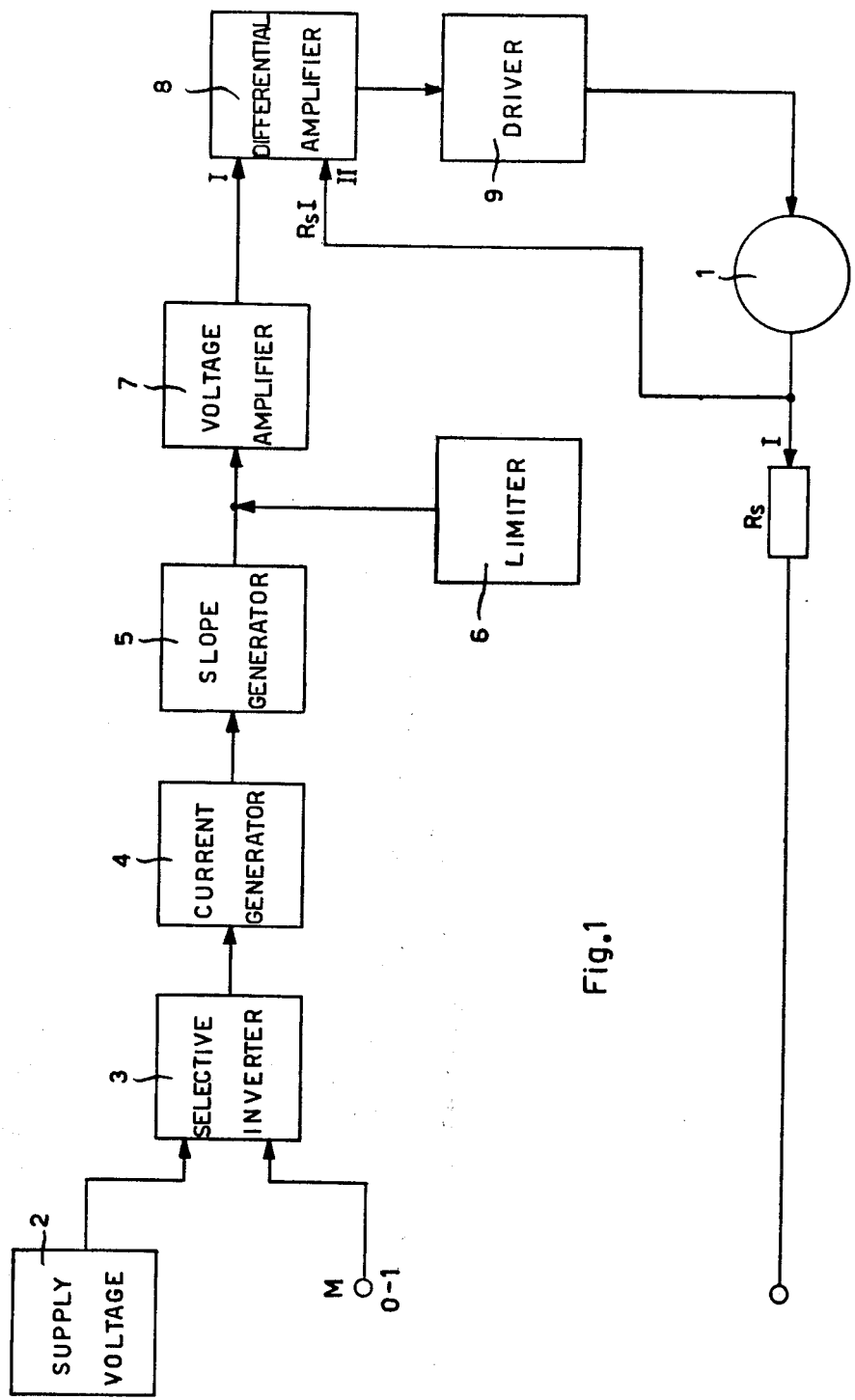
FIG. 1 is a block diagram of a driving and control system embodying the invention.

Referring to FIG. 1, a supply voltage source 2 feeds a selective inverter 3 controlled by a signal M. A positive or negative voltage is supplied to a current generator 4. When the polarity of the current changes, a slope generator 5 creates a ramp voltage by integrating action, a limiter 6 serving to establish the lower level of the ramp voltage. The resulting reference voltage is applied through a voltage amplifier 7 and a differential amplifier 8 to a driver 9 which feeds drive current to the motor 1. A feed back voltage is picked off from a resistor $R_s$ in series with the motor and combined with the reference voltage in the amplifier 8 to regulate the speed of the motor.

Figure 2:
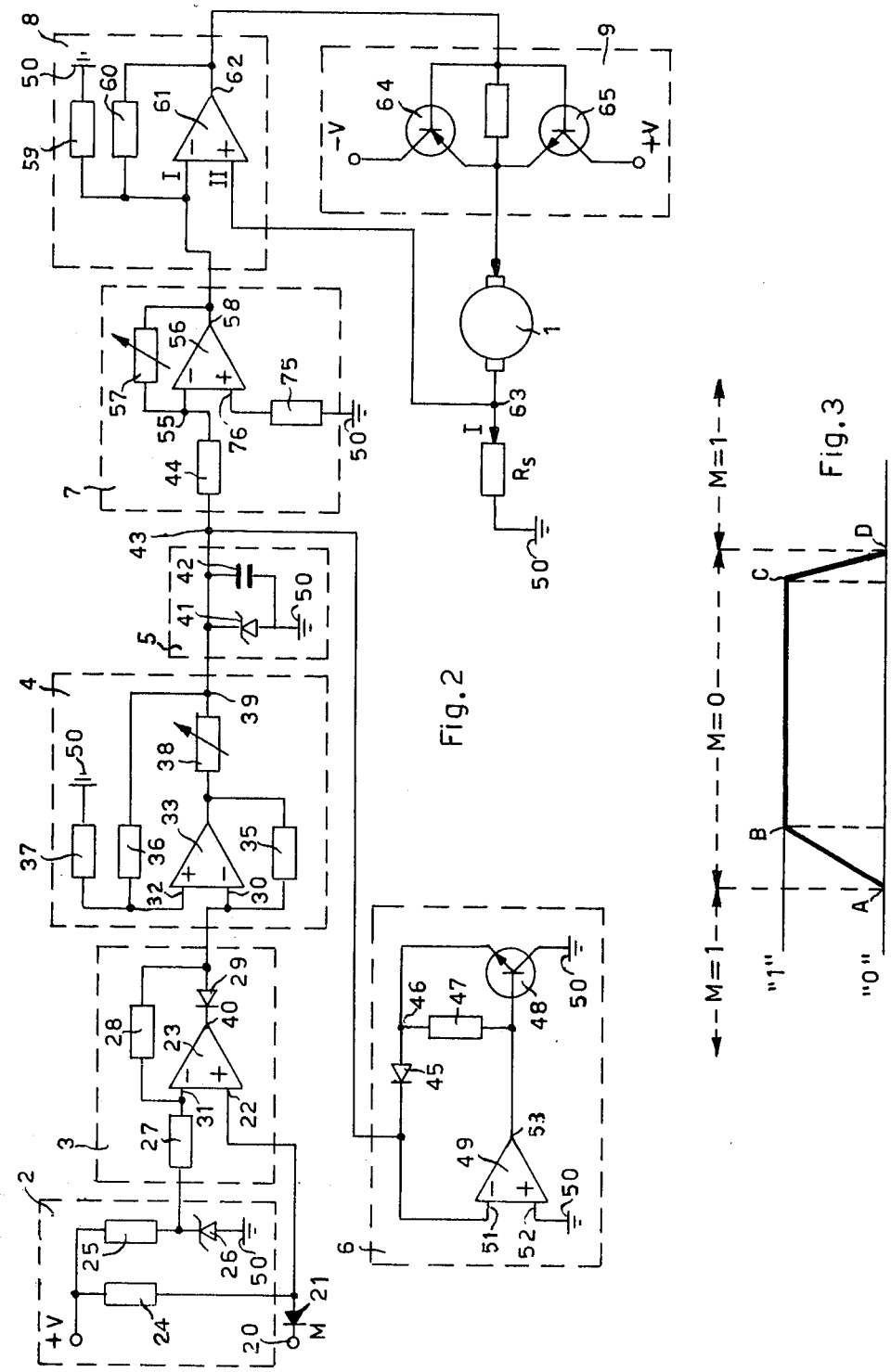
FIG. 2 is a detailed diagram of the elements forming each of the blocks in FIG. 1.

Referring to FIG. 2, in which the same functional blocks as are shown in FIG. 1 and which are identified by the same numbers are made clear by dashed lines, the command signal M is applied to the input terminal 20 connected through a diode 21 to the positive input 22 of an operational amplifier 23. The input 22 is also coupled to +V through a resistor 24. A regulated positive voltage is provided by a zener diode 26 and resistor 25 and is applied to the negative (inverting) input 31 of the amplifier 23 through a resistor 27. The signal M may assume one or the other of two levels indicated by "1" and "0", "0" for commanding the starting of the motor 1 and "1" for commanding the stopping of the motor 1. By way of example, we will assume that at the level "0" the voltage of the signal M is zero volts and at the level "1" the voltage of the signal M is 5 volts.

Let us assume, moreover, that the supply voltages +V and −V are +20 volts and −20 volts, respectively. The polarity inverting stage 3 is constituted by the operational amplifier 23 with feedback to the negative input 31 through a diode 29 and a resistor 28.

The polarity inverting stage 3 has the function of presenting at an input 30 of the current generator 4 either of two different voltage values of opposite polarities, one during the starting command and one during the stopping command of the motor 1.

Thus, when the signal M is at the level "0", the positive input 22 of the amplifier 23 is clamped substantially at zero volts and the amplifier 23 transfers to its output 40, inverting the polarity, the supply voltage provided by the Zener diode 26 connected to the ground 50. On the other hand, when the signal M is at the level "1", the voltage on the input 22 rises, by virtue of the connection to resistor 24, to a level sufficient to drive the output 40 positive. The amplifier 23 is therefore blocked and decoupled by the diode 29, whereby the supply voltage supplied by the Zener diode 26 is transferred to the input 30 of the current generator 4 through the resistors 27 and 28.

The current generating stage 4 is of known type and is constituted by an operatonal amplifier 33 with negative and positive feedback provided via resistors 35 to 38. This stage serves to feed a constant current to the network 5 which is constituted by a Zener diode 41 with a capacitor 42 in parallel therewith, both of these being connected between an output 39 of the current generator 4 and the ground 50.

The current generator 33 is connected in such manner as to maintain constant and equal to the input voltage, with unity gain, the voltage drop across the resistor 38, establishing a constant current therethrough. The magnitude of the current can be adjusted by adjusting the resistor 38. The sense of the current is determined by the signal M, current being fed out at terminal 39 when M=0.

Figure 3:
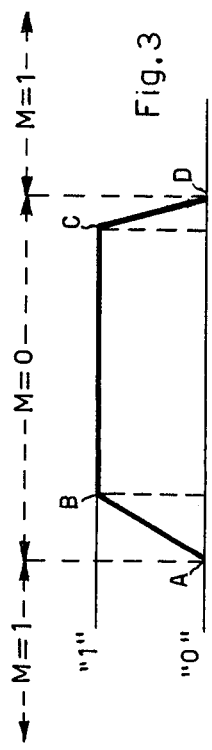
FIG. 3 is a diagram showing the course of the reference voltage.

The current generated in this way charges and discharges the circuit formed by the Zener diode 41 and the capacitor 42 so as to create, at the time of the inversions of the signal M from "0" to "1" and vice versa, the desired starting and stopping slopes indicated in FIG. 3. The said slopes therefore have fixed gradient ratios between them and are regulated by the single resistor 38, which acts equally both on the forward current and on the reverse current supplied by the generator 4.

The network 5 thus has the function of generating two voltage slopes of different gradients and opposite inclinations. In fact, when the current generator 4 supplies a forward current to the network 5, the capacitor 42 is charged to the nominal voltage of the Zener diode 41. On the other hand, when the current generator 4 draws current from the network 5, the capacitor 42 is discharged. The lower limit of the discharge voltage is controlled by the limiter circuit 6 which also acts as a current source when current ceases to be drawn from the capacitor 42.

The form of the signal present at the node 43 is indicated in FIG. 3 and comprises a substantially trapezoidally shaped signal. The portion A-B of the trapezoid represents the starting stage, the portion B-C represents normal operation and, finally, the portion C-D represents the stopping of the motor 1. The reference level of course comprises the base of the trapezoid, and is fixed by limiter circuit 6 as explained below.

The limiter circuit 6 serves to avoid the discharging current in the slope generating circuit 5 creating a negative voltage at an input 55 of a following amplifier 56. That is to say, when M changes to 1 at point C, the generator 4 draws current from the capacitor 42 only from C to D, the current then being drawn from the circuit 6, from the point when the descending slope C-D (FIG. 3) has exactly reached zero level. The limiter circuit 6 is constituted by an operational amplifier 49, a diode 45, a resistor 47 and a transistor 48 connected to an input 53 of the operational amplifier 49. As long as there is a voltage greater than zero volts at the node 43, the diode 45 is blocked and thus also the amplifier 49, since the latter has its positive input 52 connected directly to the ground. As soon as the voltage at the node 43 falls below zero volts, both the diode 45 and the transistor 48 become conducting, enabling the amplifier 49 to supply the excess current drawn by the generator 4.

The voltage amplifier 7 is formed by an operational amplifier 56 connected through the medium of resistors 44, 75 and 57 in such manner as to form an amplifier of known type. Such amplifier is a well known "inverting amplifier" in which the voltage applied to inverting input 55 is inverted and it is applied to input I of the amplifier 61.

The output 58 of the amplifier 56 is connected to a first input of an operational amplifier 61 with feedback resistors 59 and 60 and which has the function of adding the signal present at the first input I to a signal present at a second input II and picked up at one end 63 of a resistor $R_s$ connected in series between the motor 1 and earth. The differential amplifier 61, which forms the block 8, drives through its output 62 the power driver stage 9 constituted by two transistors 64 and 65 interconnected in known single-ended manner. The stage 9 has the task of supplying the necessary current to the motor so that it may perform the starting, normal working and stopping operations determined by the levels "0" and "1" of the signal M.

The signal picked up at the end 63 of the resistor $R_s$ and sent to the second input of the amplifier 61 constitutes a feedback voltage $R_s I$ (where I is the motor current) which, with the use of the above-mentioned type of motor, enables regular functioning of the motor to be obtained undisturbed by variations in the load torque and the inertia effects of the motor 1.

I claim:

1. A driving and control circuit for a D.C. motor comprising in combination:
    a direct current motor of the type including a permanent magnet and with an ironless rotor winding capable of continuous rotation in both directions, the rotation speed of the motor being proportional to said direct current supplied to it;
    a constant voltage generator responsive to a two level command signal for generating at its output a constant positive voltage in response to one level of said command signal and a constant negative voltage in response to the other level of said command signal;
    a constant current generator comprising a first operational amplifier connected to the output of said constant voltage generator, responsive to said positive and negative voltages;
    a reference voltage generator means connected to said constant current generator, for generating a substantially trapezoidally shaped reference voltage, with a rising slope and a falling slope;
    an impedance means, connected in series with said motor and ground, for developing a feedback voltage proportional to the speed of said motor;
    an inverting operational amplifier connected to said reference voltage generator for inverting said reference voltage;

a second operatonal amplifier connected to said inverting amplifier, having an inverting input, a non-inverting input and an output, for adding said feedback voltage, applied from said impedance means to said non-inverting input, to said reference voltage, applied from said reference voltage generator means to said inverting input, to establish a positive feedback summation signal for compensating for variations in the speed of said motor; and a pair of complementary transistors connected between said output and said motor, responsive to said positive feedback summation signal, for feeding over to said motor, for starting and stopping said motor in the presence of said rising and falling slopes respectively and, regulating the speed of said motor to be undisturbed by variations in load torque and inertia effects.

2. A driving and control circuit according to claim 1, wherein said reference voltage generator means comprises:

a capacitor connected to the output of said current generator and respectively charged and discharged by the current flowing through said current generator for creating said rising and falling slopes of said trapezoidally shaped reference voltage;

a Zener diode connected in parallel with said capacitor for preventing the capacitor from being charged to a voltage exceeding the normal running voltage level of said motor; and a discharge limiting circuit connected to the output of said reference voltage generator means, comprising a third operational amplifier, having an inverting input connected to said capacitor, a non-inverting input and an output, a transistor having a base, an emitter and a collector, and a diode, wherein said emitter is connected, through said diode, to said inverting input, said base is connected to said operational amplifier output and said collector is connected to said non-inverting input for determining a predeterminate voltage level to which said capacitor is discharged, by controlling the current flowing through said current generator.

3. a driving and control circuit according to claim 1, wherein said impedance means is an ohmic resistor.

4. A driving and control circuit as claimed in claim 1 wherein said constant voltage generator comprises a polarity inverting stage for presenting either of two voltages of opposite polarities to said constant current generator for starting and stopping said motor, a reference voltage source connected to said polarity inverting stage and means for supplying said command signal to said polarity inverting stage to control the polarity of the constant output voltage thereof.

5. A driving and control circuit as claimed in claim 4 wherein said polarity inverting stage includes a third operational amplifier and a bypass circuit for said amplifier, said reference voltage sources being a constant voltage connected to both inputs of said third operational amplifier, said command level supplying means being coupled to one of said inputs of said third operational amplifier, whereby the output of said stage is taken from said bypass circuit or said amplifier as a function of the level of the applied command signal.

* * * * *